A. F. RUTHVEN.
PNEUMATIC TIRE.
APPLICATION FILED FEB. 10, 1913.
1,215,717.
Patented Feb. 13, 1917.
2 SHEETS—SHEET 1.
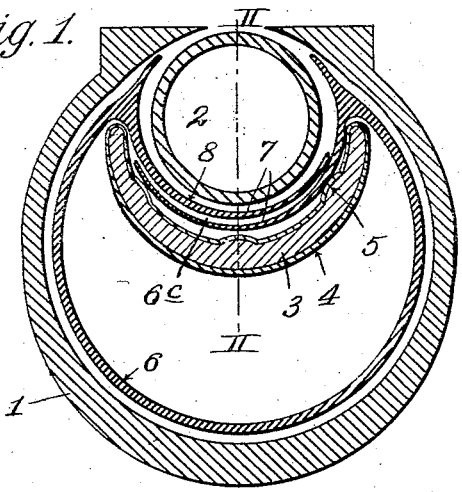
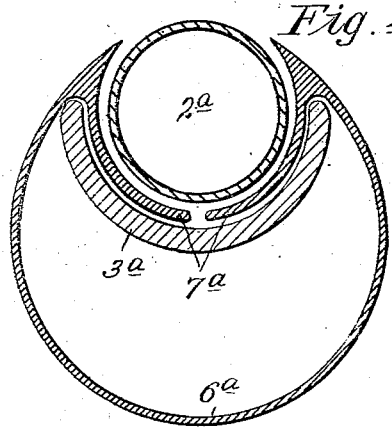
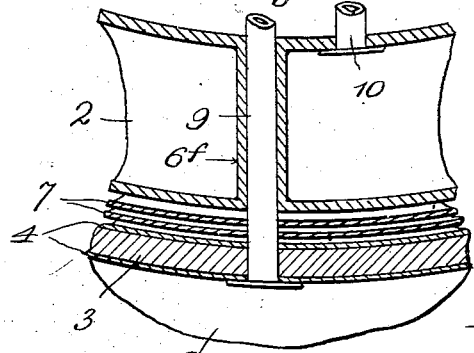
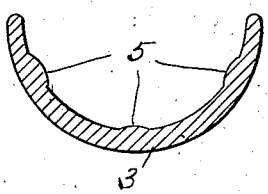
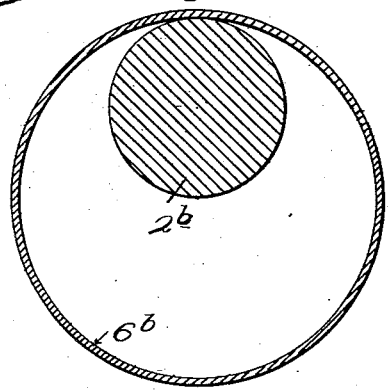
WITNESSES:
L. J. Fischer
R. E. Hamilton
INVENTOR
Albert Francis Ruthven,
BY
F. G. Fischer,
ATTORNEY.

A. F. RUTHVEN.
PNEUMATIC TIRE.
APPLICATION FILED FEB. 10, 1913.

1,215,717.

Patented Feb. 13, 1917.
2 SHEETS—SHEET 2.

WITNESSES:
L. J. Fischer
R. C. Hamilton

INVENTOR:
Albert Francis Ruthven,
BY
F. G. Fischer,
ATTORNEY.

UNITED STATES PATENT OFFICE.

ALBERT FRANCIS RUTHVEN, OF KANSAS CITY, MISSOURI.

PNEUMATIC TIRE.

1,215,717.  Specification of Letters Patent.  Patented Feb. 13, 1917.

Application filed February 10, 1913. Serial No. 747,478.

*To all whom it may concern:*

Be it known that I, ALBERT FRANCIS RUTHVEN, a citizen of the United States, residing at Kansas City, in the county of Jackson and State of Missouri, have invented certain new and useful Improvements in Pneumatic Tires, of which the following is a specification.

My invention relates to improvements in pneumatic tires for automobiles, bicycles, and other vehicles and one of my objects is to provide a new and useful device of this character whereby a vehicle may travel over a road without its wheel rims cutting the tires should the same be deflated for any reason, as, for instance, by puncture.

A further object is to provide an inner tube which can be readily patched on the inside in case of puncture.

Other objects of the invention will hereinafter appear, and in order that said invention may be fully understood, reference will be made to the accompanying drawings, in which:

Figure 1 is a transverse section of my improved tire.

Fig. 2 is a broken longitudinal section on line II—II of Fig. 1.

Fig. 3 is a detail cross section of an inner rim forming part of the invention.

Fig. 4 is a transverse section of a modified form of tire and inner rim, with the outer case removed.

Fig. 5 is a transverse section of a modified form of inner tube and supplemental tire, forming part of my invention.

Figure 6:
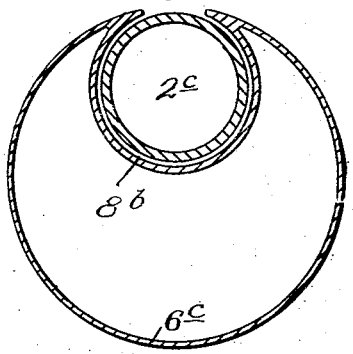
Fig. 6 is a transverse section of a modified form of inner tube and supplemental tire.

Referring particularly to Fig. 1, 1 designates an outer casing which may be of the usual clencher type as shown, or any preferred form in which access may be had to the interior thereof.

2 designates a supplemental tire, which may be either tubular in form, as shown on Fig. 1, or solid as shown on Fig. 5.

3 designates an inner rim, which may be of metal or any other suitable material, but when made of metal is, preferably, inclosed in a rubber or other cushion 4. Rim 3 is reinforced, in its preferred form, with a plurality of peripheral ribs 5, which also perform another function that will hereinafter appear.

6 designates an inner tube, preferably, arranged with an opening $6^c$, extending around its entire periphery to admit the rim 3. In order that the peripheral opening in the inner tube 6 may be closed against the escape of air when said inner tube is inflated, I provide said tube at its open periphery with a pair of flaps 7, which lap each other as shown on Fig. 1. Flaps 7 are concave in cross section to form an annular seat 8 for the supplemental tire 2.

9 designates the usual valve, the stem of which communicates with the inner tube 6, so that the same can be inflated in the customary manner, and 10 designates a valve communicating with the supplemental tire 2, so that the same may be inflated independent of the inner tube 6. Inner tube 6 has an integral sleeve $6^t$, for the stem of valve 9 to extend through.

Fig. 1 shows the position which the supplemental tire 2 and the inner tube 6 occupy when only partly inflated. When fully inflated the inner tube 6 is expanded until it lies firmly against the interior of the outer case 1, and when the supplemental tire 2 is inflated it bears firmly against the outer case 1 and the upper flap 7, firmly forcing the same against the lower flap which in turn is forced against the periphery of rim 3, thereby sealing or closing the inner tube 6, so that air pumped therein cannot escape. The peripheral ribs 5 of rim 3 embed the lower flap 7 into the upper flap and thus more effectually seal the inner tube 6.

Should the outer case 1 and the inner tube 6 become punctured while on the road and thus become deflated, it will not be necessary to stop and repair the puncture as the supplemental tire 2 will afford a sufficient cushion to continue on the trip until a point is reached where it is convenient to stop and repair the puncture, and as said supplemental tire is protected by the rim 3, it of course, is in no danger of becoming punctured.

As the outer case 1 and the inner tube 6 are supported by the rim 3, when deflated, they cannot be flattened out sufficiently to be cut or otherwise injured by the rim (not shown) in which the outer case 1 is mounted.

When the inner rim 3 is made of softer material than metal its cushion cover 4 may be dispensed with, as shown on Fig. 3.

The modified form disclosed by Fig. 4 is similar to that of the preferred form, except that the flaps 7$^a$ of the inner tube 6$^a$ do not lap, and the inner rim 3$^a$ is not provided with the ribs 5.

The modified form disclosed by Fig. 5 shows the inner tube 6$^b$ without the opening or the flaps, but completely closed. In this construction, the supplemental tire 2$^b$, which is made of any suitable material is solid so that it cannot become punctured. Hence, the inner rim 3 is not required. Of course, in this construction the supplemental tire 2$^a$ is placed in the inner tube 6$^b$ before the ends thereof are connected in the usual manner.

In the modified form disclosed by Fig. 6, 6$^c$, shows the inner tube made in one piece with the flaps omitted and containing a seat 8$^b$ for the supplemental tire 2$^c$.

Figure 7:
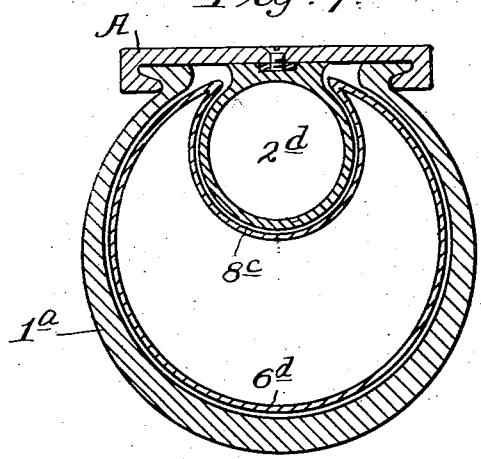
Fig. 7 is a transverse section of a modified tire.
Figure 8:
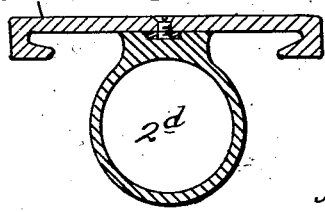
Fig. 8 is a detail of the supplemental tire, shown on Fig. 7.

In the modified form disclosed by Fig. 7, 1$^a$ designates the outer case, mounted in a rim A, to which is secured in any suitable manner a supplemental tire 2$^d$, which lies in a seat 8$^c$ in the inner tube 6$^d$. Should the outer case 1$^a$ and the inner tube 6$^d$, become deflated it is apparent that the supplemental tire 2$^d$ would support said inner tube and outer case sufficiently to prevent rim A from cutting said case.

When the supplemental tires disclosed in Figs. 1 and 7, are fully inflated they firmly hold their respective outer cases in position in the outer rims.

Having thus described my invention what I claim and desire to secure by Letters Patent, is:

In a tire of the character described, an inner tube having a peripheral opening, flaps on the inner tube to close said opening, a supplemental tire to close said flaps, and a rim of hard material within the inner tube coacting with said supplemental tire to close the flaps.

In testimony whereof I affix my signature, in the presence of two witnesses.

ALBERT FRANCIS RUTHVEN.

Witnesses:
F. G. Fischer,
L. J. Fischer.